US006819766B1

United States Patent
Weidong (10) Patent No.: US 6,819,766 B1
(45) Date of Patent: Nov. 16, 2004

(54) METHOD AND SYSTEM FOR MANAGING KEYS FOR ENCRYPTED DATA

(75) Inventor: Kou Weidong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,246

(22) Filed: Mar. 22, 2000

(30) Foreign Application Priority Data

Mar. 30, 1999 (CA) .......................................... 02267395

(51) Int. Cl.[7] ................................................. H04L 9/00
(52) U.S. Cl. ........................ 380/277; 380/278; 380/281
(58) Field of Search ............................... 380/277, 278, 380/281

(56) References Cited

U.S. PATENT DOCUMENTS 5,883,956 A * 3/1999 Le et al. ..................... 713/170
5,937,066 A * 8/1999 Gennaro et al. ............ 380/286

FOREIGN PATENT DOCUMENTS

GB        2325123 A   * 11/1998   ............. H04L/9/08

* cited by examiner

*Primary Examiner*—Gilberto Barron
*Assistant Examiner*—Cas Stulberger
(74) *Attorney, Agent, or Firm*—William A. Kinnamen, Jr.

(57) ABSTRACT

A computer system and method manages encryption keys for data. The system and method generates a session key and encrypts given data with the session key. The system and method generates a key encryption key based on a secret initial vector, or password. The session key is encrypted using the key encryption key. The encrypted data and the encrypted session key are then interleaved according to a set of indices created by a one-way transform. The one-way transform takes as its input the initial vector, the length of the encrypted session key and the length of the encrypted data. The data is recovered by a party knowing the initial vector using the one-way transform to determine the location of the encrypted session key in the interleaved data. The session key is decrypted which allows the data to be decrypted.

22 Claims, 2 Drawing Sheets

METHOD AND SYSTEM FOR MANAGING KEYS FOR ENCRYPTED DATA

BACKGROUND OF THE INVENTION

1. Field of the Invention

The present invention is directed to an improvement in computing systems and in particular to computer systems which manage keys for encrypted data.

2. Description of the Related Art

As confidential and sensitive data is increasingly stored on computer systems, or transmitted over communications networks, including the Internet, it is of increasing importance to have methods and systems to ensure the security of such data. Typically, such data is encrypted as it is stored or transmitted by a computer system and then decrypted when the data is to be accessed after being retrieved or received. Many different approaches are known to those skilled in the art and are available to permit users to encrypt and then decrypt computer data.

To encrypt data, data encryption keys are required. A typical encryption system takes as input the source data to be encrypted and an encryption key. For the same source data, but different encryption keys, a typical encryption system will create different encrypted data. It is intended that only a person knowing the encryption key will be able to decrypt the encrypted data.

It is a poor security practice if one encrypts all data using a single data encryption key or a single set of data encryption keys. This is because by reusing the same key or set of keys, more data are available for analysis of encrypted data (cryptanalysis) for a third party to break the encryption system. Therefore, to ensure the security of a series or collection of encrypted data, for each piece of data (or each occasion) to be encrypted in the series or collection, different data encryption keys are used.

The data encryption keys for each occasion are called session keys because an occasion usually corresponds to a communication session if data are transmitted over a communication network. The term "session key" is also applicable to occasions where no communication is involved but where data encryption is required. The more encrypted data or files one produces the more data encryption keystone has. Matching data encryption keys to the corresponding encrypted data becomes a key management problem if there are many instances of encrypted data and a correspondingly large number of data encryption keys.

Misplacing or losing data encryption keys, or mismatching the data encryption keys and encrypted data, result in the failure to decrypt the encrypted data. It is therefore important to be able to ensure that the correct data encryption keys are associated with the appropriate encrypted data. However, a method of associating the encryption keys with the encrypted data which is simple and easy to use for the party intended to retrieve the encrypted data will also be potentially simple and easy for unauthorized parties to use, to the detriment of the security of the encrypted data. This potential difficulty is present where the data encryption keys are stored or transmitted together with the encrypted data. Although such a simple system ensures that the encryption keys are available to the recipient or person intended to retrieve the data, others may also find the encryption keys and decrypt the encrypted message.

Security for such a system, where the encryption keys are included with the encrypted message, is not to store or transmit the encryption keys in an easily readable format but rather to encrypt the encryption keys themselves. This approach means that the data encryption keys will be encrypted by a key encryption key. This in turn leads to the problem how to transmit or store the key encryption key so that it remains secure.

In the prior art, a security infrastructure to solve the key management problems is often used. Such a security infrastructure may either involve a key distribution center for a symmetric encryption system or a certificate authority used in asymmetric encryption (public key encryption). A key distribution center generates symmetric key encryption keys and distributes them to users in a secure manner. For asymmetric encryption, a certificate authority issues a certificate to a user, which contains the user's public key and is digitally signed by the certificate authority. A user can generate session keys to encrypt data, then using the receiver's public encryption key the user will encrypt the session keys. The receiver can recover the session keys through decryption using the receiver's private decryption key. Encrypted data can be decrypted using the recovered session keys.

Both key distribution centers and certificate authorities are known to those skilled in the art. Use of such security infrastructures is made in sophisticated computer systems where data security is required. However, for most users, such an infrastructure is unavailable, expensive to implement it, or inconvenient.

It is therefore desirable to have a computer system which is capable of encryption key management without requiring a security infrastructure such as a key distribution center or a certificate authority.

SUMMARY OF THE INVENTION

According to one aspect of the present invention, there is provided an improved system for managing keys for encrypted data.

According to another aspect of the present invention, there is provided a method for managing encryption keys for data comprising the steps of:

a) generating a session key;

b) encrypting the data using the session key, the encrypted data having a binary representation;

c) generating a key encryption key based on an initial vector, the initial vector being known only to a party encrypting the data and a party intended to decrypt the data;

d) encrypting the session key using the key encryption key, the encrypted session key having a binary representation;

e) generating a set of indices by a one-way transform mapping based on the length of the binary representation of the encrypted session key, the length of the binary representation of the encrypted data, and the initial vector; and f) reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices.

According to a further aspect of the present invention there is provided a method for the selective decryption of the data encrypted as described above, the decryption including the steps of:

a) regenerating the set of indices by using the one-way transform mapping based on the length of the binary representation of the encrypted session key, the length of the binary representation of the encrypted data, and the initial vector;

b) rebuilding the encrypted session key by using the regenerated set of indices to extract the segments of the binary representation of the encrypted session key from the output set of binary data and assembling the segments to form the encrypted session key;

c) rebuilding the encrypted data by using the regenerated set of indices to extract the binary representation of the encrypted data from the output set of binary data;

d) regenerating the key encryption key, using the initial vector;

e) regenerating the session key by decrypting the rebuilt encrypted session key using the regenerated key encryption key; and f) decrypting the rebuilt encrypted data using the regenerated session key.

According to another aspect of the present invention, the above methods are implemented in which the number of elements in the set of indices is equal to the number of 8-bit bytes in the binary representation of the encrypted session key, in which each element of the set of indices is an index into the binary representation of the encrypted data, and in which each segment of the encrypted session key is one byte long, whereby the step of interleaving the encrypted session key with the encrypted data comprises the bytes of the binary representation of the encrypted session key being inserted at the byte-location in the binary representation of the encrypted data determined by the indices.

According to another aspect of the present invention, the above methods include the further step of padding the output set of data with data representing the length of the binary representation of the encrypted data and with data representing the length of the binary representation of the encrypted session key.

According to another aspect of the present invention, there is provided a method for managing encryption keys in a computer system environment having a client and a server, including the steps of:

a) authenticating communication between the client and the server;

b) securely communicating an initial vector to the client and the server;

c) defining a server application and a client application in the server, whereby the client application comprises computer code, for a set of data, for the following functions:
  i) generating a session key;
  ii) encrypting the set of data using the session key, the encrypted data having a binary representation;
  iii) generating a key encryption key based on the initial vector;
  iv) encrypting the session key using the key encryption key, the encrypted session key having a binary representation;
  v) generating a set of indices by a one-way transform mapping based on the length of the binary representation of the encrypted session key, the length of the binary representation of the encrypted data, and the initial vector; and
  vi) reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices;

and whereby the client application comprises computer code for the following functions:
  vii) regenerating the set of indices by using the one-way transform mapping based on the length of the binary representation of the encrypted session key, the length of the binary representation of the encrypted data, and the initial vector;
  viii) rebuilding the encrypted session key by using the regenerated set of indices to extract the segments of the binary representation of the encrypted session key from the output set of binary data and assembling the segments to form the encrypted session key;
  ix) rebuilding the encrypted data by using the regenerated set of indices to extract the binary representation of the encrypted data from the output set of binary data;
  x) regenerating the key encryption key, using the initial vector;
  xi) regenerating the session key by decrypting the rebuilt encrypted session key using the regenerated key encryption key; and
  xii) decrypting the rebuilt encrypted data using the regenerated session key;

d) providing the client application to the client; and e) communicating between the client and the server by sets of data which are encrypted by the functions of the client application and decrypted by the functions of the server application.

According to another aspect of the present invention, there is provided a method for managing encryption keys for a plurality of sets of data comprising the steps of:

a) initializing an initial vector; and b) for each set of data:
  i) generating an associated session key for the set of data using an encryption key generation algorithm whereby there is a low probability that more than two or more of the plurality of sets of data will share the same session key;
  ii) encrypting the set of data using the associated session key, the encrypted set of data having a binary representation;
  iii) generating a key encryption key for the associated session key, based on the initial vector;
  iv) encrypting the associated session key using the key encryption key, the encrypted associated session key having a binary representation;
  v) generating a set of indices for the set of data by a one-way transform mapping based on the length of the binary representation of the encrypted associated session key, the length of the binary representation of the encrypted set of data, and the initial vector; and
  vi) reformatting the binary representation of the encrypted set of data to generate an output set of binary data by interleaving the encrypted associated session key with the encrypted set of data by dividing the binary representation of the encrypted associated session key into segments and inserting the segments into the binary representation of the encrypted set of data at locations determined by the set of indices.

According to another aspect of the present invention, in the above methods the step of initializing the initial vector includes the step of receiving a password from a user.

According to another aspect of the present invention, in the above methods the step of initializing the initial vector further comprises the step of a deriving the initial vector from a function which takes as its input the password, a timestamp, and a message digest which is a hashed value of a subset of the plurality of the encrypted sets of data.

According to another aspect of the present invention, there are provided program storage devices readable by a machine, tangibly embodying a program of instructions executable by the machine to perform the above methods.

According to another aspect of the present invention, there is provided a computer system for managing encryption keys for data comprising:

a) means for generating a session key;
b) means for encrypting the data using the session key, the encrypted data having a binary representation;
c) means for generating a key encryption key based on an initial vector, the initial vector being known only to a party encrypting the data and a party intended to decrypt the data;
d) means for encrypting the session key using the key encryption key, the encrypted session key having a binary representation;
e) means for generating a set of indices by a one-way transform mapping based on the length of the binary representation of the encrypted session key, the length of the binary representation of the encrypted data, and the initial vector; and
f) means for reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices.

According to another aspect of the present invention, the above system further includes means for the selective decryption of the encrypted data having:

a) means for regenerating the set of indices by using the one-way transform mapping based on the length of the binary representation of the encrypted session key, the length of the binary representation of the encrypted data, and the initial vector;
b) means for rebuilding the encrypted session key by using the regenerated set of indices to extract the segments of the binary representation of the encrypted session key from the output set of binary data and assembling the segments to form the encrypted session key;
c) means for rebuilding the encrypted data by using the regenerated set of indices to extract the binary representation of the encrypted data from the output set of binary data;
d) means for regenerating the key encryption key, using the initial vector;
e) means for regenerating the session key by decrypting the rebuilt encrypted session key using the regenerated key encryption key; and
f) means for decrypting the rebuilt encrypted data using the regenerated session key.

According to another aspect of the present invention, there is provided a computer program product for managing encryption keys in a computer system environment having a client and a server, comprising a computer usable medium having computer readable code means embodied in said medium to perform steps including:

a) authenticating communication between the client and the server;
b) securely communicating an initial vector to the client and the server;
c) defining a server application and a client application in the server, whereby the client application comprises computer code, for a set of data, for the following functions:

i) generating a session key;
ii) encrypting the set of data using the session key, the encrypted data having a binary representation;
iii) generating a key encryption key based on the initial vector;
iv) encrypting the session key using the key encryption key, the encrypted session key having a binary representation;
v) generating a set of indices by a one-way transform mapping based on the length of the binary representation of the encrypted session key, the length of the binary representation of the encrypted data, and the initial vector; and
vi) reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices;

and whereby the client application comprises computer code for the following functions:

vii) regenerating the set of indices by using the one-way transform mapping based on the length of the binary representation of the encrypted session key, the length of the binary representation of the encrypted data, and the initial vector;
viii) rebuilding the encrypted session key by using the regenerated set of indices to extract the segments of the binary representation of the encrypted session key from the output set of binary data and assembling the segments to form the encrypted session key;
ix) rebuilding the encrypted data by using the regenerated set of indices to extract the binary representation of the encrypted data from the output set of binary data;
x) regenerating the key encryption key, using the initial vector;
xi) regenerating the session key by decrypting the rebuilt encrypted session key using the regenerated key encryption key; and
xii) decrypting the rebuilt encrypted data using the regenerated session key;

d) providing the client application to the client; and
e) communicating between the client and the server by sets of data which are encrypted by the functions of the client application and decrypted by the functions of the server application.

Advantages of the present invention include having segments of the encrypted session key stored with the encrypted data, such that the encrypted session key cannot be lost or disassociated from the encrypted data.

BRIEF DESCRIPTION OF THE DRAWINGS

The preferred embodiment of the invention is shown in the drawings, wherein.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 1:
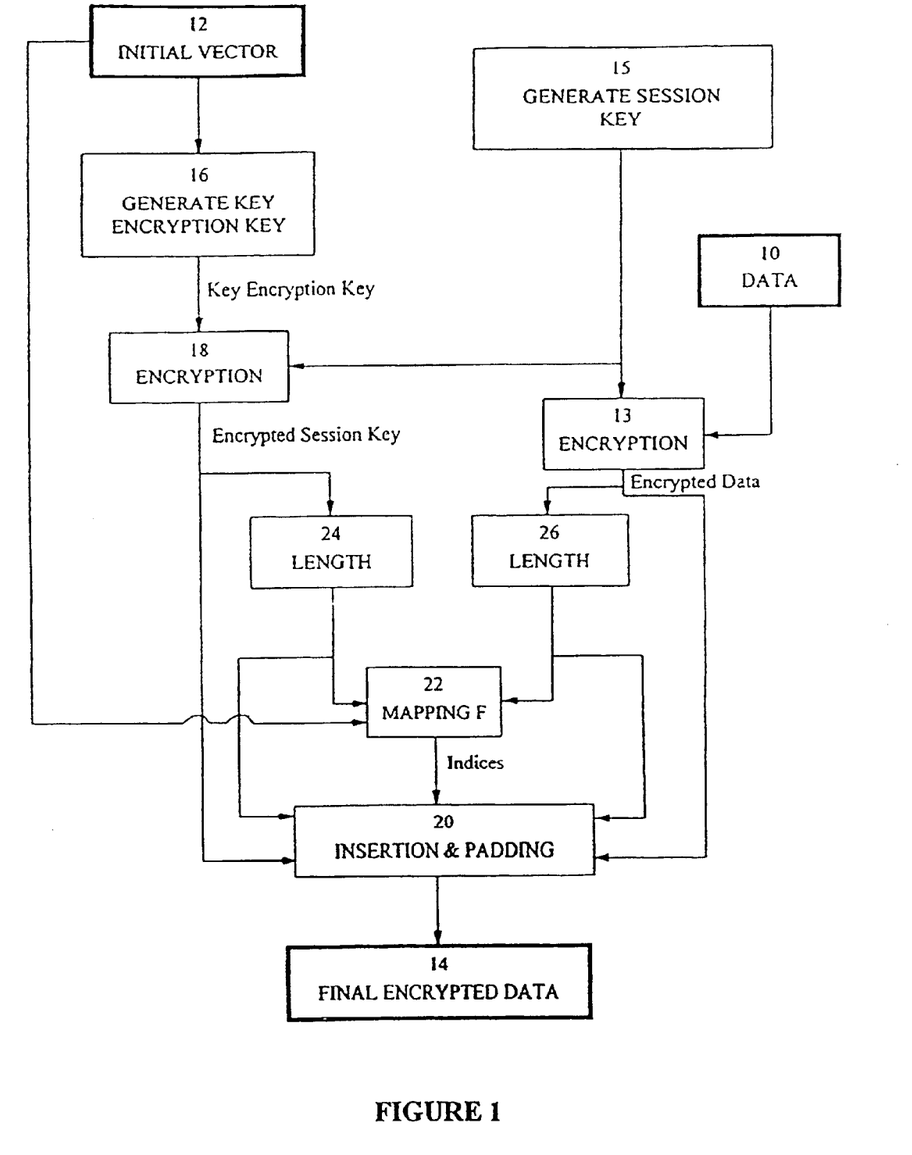
FIG. 1 is a block diagram showing the system for managing keys for encrypted data as provided for by the preferred embodiment.

Referring to FIG. 1, a block diagram shows data encryption according to the preferred embodiment of the invention. According to the preferred embodiment as illustrated in FIG. 1, data 10 and initial vector 12 are provided as inputs to the system. Data 10 is encrypted as shown in block 13. Final encrypted data 14 is the data which is produced as a result of the encryption carried out according to the preferred embodiment. Encryption 13 is based on a session key generated as represented in block 15. In the preferred embodiment, an initial vector 12 is used to generate a key encryption key as shown in block 16 which is used to encrypt the session key as shown in block 18.

The final encrypted data 14 is created by insertion and padding as shown in block 20. The insertion and padding is carried out in accordance with a mapping F shown in block 22. Mapping F includes as inputs the length of the encrypted session key as determined in block 24 and the length of the encrypted data as shown in block 26. The data and keys in the preferred embodiment are binary representations stored and manipulated by digital computers. Where the description below refers to the data and keys it will be apparent to those skilled in the art that the data and keys have binary representations which may be manipulated by digital computers and systems.

In use, initial vector 12 is input by the user of the system of the preferred embodiment. Initial vector 12 may be a password which the user intends to remember or may be a combination of a system user identifier, password, or other information which is intended to be stored in a secure manner separate from the data to be encrypted. It can also be a combination of a password, and a timestamp and/or a message digest which is a hashed value of encrypted data. Initial vector 12 is used to generate a key as shown in block 16. Because typical encryption systems, as represented in block 18 require keys of a particular format, initial vector 12 is typically unusable as the encryption key for encryption 18 and the appropriately formatted key is generated as represented in block 16. A method of generating an encryption key from a user-defined initial vector or password is provided in Canadian Patent Application 2,210,763, naming Weidong Kou as the inventor and IBM Canada Ltd. as the applicant, as well as in the corresponding U.S. application Ser. No. 08/902,647, filed Jul. 30, 1997. Other methods of generating an encryption key are also known to those skilled in the art.

The key generated by encryption 18, based on initial vector 12, is a key encryption key used to encrypt the session key produced as shown by block 15 in FIG. 1. For data 10, the system of the preferred embodiment generates a session key as shown in block 15. The method of generating the session key represented in block 15 may be one of the methods known in the art, for example, the ANSI standard key generation algorithm for encrypting data or files. The session key so generated is used to encrypt data 10 in encryption 13. The session key generated as represented in block 15 is then also encrypted as shown in block 18.

Although the preferred embodiment is described with respect to a single key being used for encryption, it will be apparent to those skilled in the art that where a selected encryption system requires multiple keys, the system of the preferred embodiment may be appropriately modified to deal with multiple keys. For example, the encryption carried out in the system of the preferred embodiment may be the Data Encryption Standard (DES) encryption. Alternatively, a triple DES system may be used for the encryption of the preferred embodiment.

As will be apparent to those skilled in the art, the system of the preferred embodiment includes two encryptions: the encryption of the data and the encryption of the session key. The encryption algorithm selected for the two encryptions may be the same for both, or different. The system of the preferred embodiment does not depend on the nature of the symmetric encryption algorithms selected, apart from the fact that the encryption is to be secure and is to be key-based.

The final encrypted data 14 is generated by insertion and padding as shown in FIG. 1 by block 20. Insertion and padding combines the encrypted data generated by encryption and the encrypted session key generated by encryption 18, and includes other information about the encrypted data as described below. The encrypted session key and the encrypted data are interleaved according to a set of indices which are produced by mapping F as shown in block 22 in FIG. 1.

Mapping F takes as its input the length of the encrypted session key as shown by block 24 on FIG. 1. In the preferred embodiment this is the length of the binary representation of the encrypted session key, in 8-bit bytes. Mapping F also takes as input the length of the encrypted data, as shown in block 26 in FIG. 1. In the preferred embodiment this is the length of the binary representation of the encrypted data, in 8-bit bytes. Initial vector 12 is also input for mapping F. Mapping F as shown in block 22 produces indices by a mapping $$F(v,L,k)=(I_1, \ldots, I_k),$$

where v is the initial vector, $I_j$ are indices, L is the length of the encrypted data, and k is the length of the encrypted session key. The mapping F is a generic one-way transform that takes an initial vector, a length of encrypted data, and the length of an encrypted session key, both in number of bytes, and produces a set of indices. An one-way transform is a transform that cannot be inverted. Appropriate one-way transforms for mapping F will be apparent to those skilled in the art. An example of such a transform is a simple table lookup function. Another approach which may be used as the basis for mapping F is the MD5 algorithm, which provides a one-way transform and may be modified to yield the appropriate indices for the inputs described above.

Mapping F, as shown in block 22, provides indices which are used in insertion of the encrypted session key into the encrypted data as represented in block 20. The insertion is carried out by breaking the binary representation of the session key into k pieces, each piece therefore being one byte long. The r-th byte of the session key is inserted into the binary representation of the encrypted data before the $I_r$-th byte of the encrypted data. The encrypted session key is therefore stored interleaved with the encrypted data. This reformatted binary form of the encrypted session key interleaved with the encrypted data is an output set of binary data. The locations of the bytes of the encrypted session key in the output set of binary data are thus determined by mapping F, which is a one-way transform and which is dependent on the lengths of the binary representations of the encrypted data and session key, and on the initial vector.

This interleaving of the encrypted session key with the encrypted data permits the encrypted session key for the data to be stored with the encrypted data. The session key cannot be disassociated from the encrypted data as is sometimes possible with other systems. The encrypted session key is not made available to unauthorized recipients of the encrypted data, however, because the encrypted session key is located within the encrypted data at locations which are determined by the one-way transform of mapping F. It is necessary to know mapping F, initial vector 12, and the lengths of the encrypted session key and the encrypted data to determine the locations of the bytes of the encrypted session keys in the final encrypted data.

The final step in the insertion and padding of block 20 is to pad the information required for decryption, except the initial vector, to form final encrypted data 14 (the output set of binary data). The required information for decryption includes the length of the encrypted session key (k in mapping F) and the length of the original encrypted data (L in mapping F). The binary representation of this required information is added to the interleaved encrypted data and encrypted session key, typically at the end of the encrypted data. Other information may also be padded in final encrypted data 14. For example, where the initial vector includes a message digest, a timestamp, or both, in addition to a password, the message digest and/or timestamp will be included in final encrypted data 14.

To decrypt the encrypted data, one must first extract, or rebuild, the encrypted session key from the final encrypted data. This is done using mapping F. For decryption, initial vector 12 must be known. The length information of the encrypted session keys and of the original encrypted data are available from final encrypted data 14. Initial vector 12 in contrast must be memorized or stored in some other secure manner (for example on a smart card). The mapping F is used to again generate the indices which point to the locations of the bytes of the encrypted session key interleaved in the encrypted data. These indices are used to extract the bytes of the encrypted session key and to rebuild the encrypted session key. The encrypted data is also rebuilt (or reformatted) by removing the padding information and the encrypted session key segments from the final encrypted data.

Using the same algorithm as referred to above and with the same initial vector 12, the key decryption key (the same as the key encryption key) is then regenerated to permit the decryption of the encrypted session key. Once the regenerated session key is obtained, the original data can be regenerated by the decryption process using the regenerated session key and the rebuilt encrypted data.

The system of the preferred embodiment permits a single initial vector 12 to be used for several different sessions. Each different session will most likely have a different session key, but the problem of key management will be simplified as the same initial vector will be used. A user of the system will have to keep only the single initial vector secure, rather than the set of all session keys. There is also a simplification of managing which key is associated with which data session. Each encrypted session key is stored interleaved with its associated encrypted data, and no additional key management is required to ensure that the correspondence between data and session key is maintained.

The security requirements of individual users will dictate for how many different sessions the same initial vector may be used. The more often the same initial vector is used, the less secure the system becomes. However, the security of the system of the preferred embodiment in which one initial vector is reused for several sessions is greater than the security of a system in which one session key is reused for several sessions.

As may be seen from the above, neither a key distribution center nor a certificate authority is required in the system of the preferred embodiment. In addition, the encrypted session keys are embedded in the encrypted data such that encrypted data and keys used for the encryption always bind each other. This property eliminates the key management problems associated with binding the keys and encrypted data. It prevents the encrypted keys from being potentially lost or misplaced, and avoids mismatching the encrypted keys and the encrypted data. Further, the encrypted session keys are hidden in the encrypted data which reduces the risk of an unauthorized access to the data permitting the encrypted session key being attacked. The session key for data encryption is randomly generated for each session. The preferred embodiment of the invention uses the ANSI standard session key generation algorithm, for which it has been proven that the probability that session keys generated by the algorithm for two different sessions will be the same is extremely low.

An example of how the system of the preferred embodiment may be used is where a file is to be stored in an encrypted form on the disk of a personal computer. The following sets out the steps which may be followed to use the system of the preferred embodiment in such a manner:

Step 1: Generate a data encryption key (the session key) and encrypt the file.

Step 2: Use a logon password (the initial vector) to generate a key encryption key to encrypt the data encryption key (the session key).

Step 3: Encrypt the data encryption key (session key) using the encryption key generated from the password.

Step 4: Use one-way transform mapping F to generate indices based on the password, the length information of the encrypted file and of the encrypted data encryption key.

Step 5: Break the encrypt data encryption key into pieces with each piece in one byte long, and insert these pieces (encrypted encryption key bytes) into the encrypted data according to the indices produced in Step 4.

Step 6: Pad the length information of the encrypted encryption key and of the encrypted data to the result produced in Step 5. In this step, a separator is needed between two pieces of length information.

As will be apparent to those skilled in the art, these steps may be carried out in software, and are transparent to a user. When a user wants to save a file, a dialogue window can be popped up to ask the user whether he or she wishes to save the file as encrypted. When the answer is yes, an input window is popped up to ask the user to enter a password. After a password is entered, the above six steps will be triggered. The file is encrypted and saved by hiding the encrypted data encryption key in the encrypted data.

A second example of the use of the system of the preferred embodiment is with respect to the client-server architecture found on the Internet and in other networking environments. This is illustrated in FIG. 2.

FIG. 2 is a set of block diagrams 2a, 2b, 2c and 2d showing web browser 30 and web server 32.

Figure 2A:
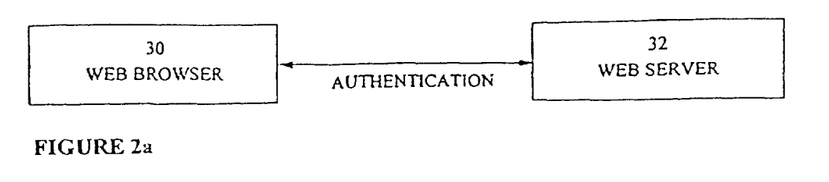
FIG. 2 is a block diagram showing the system of FIG. 1 as it is applied to a web-server and browser environment.
Figure 2B:
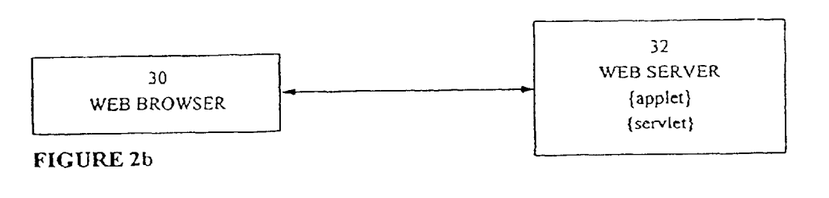

FIG. 2a shows the authentication step between browser 30 and web server 32, after a user has been registered on a particular web site with a user ID and a password. This authentication step is a typical security check performed to ensure that identities of the web browser user and web server are appropriate. FIG. 2b shows web server 32 creating an applet and servlet to be used in encrypted communication between web browser 30 and web server 32. The applet will contain computer code, such as Java language code, to implement key generation, encryption and the mapping F, as described above. For example, the applet may contain a hash value of a combination of a timestamp, user's ID and user's password. The applet implements the mapping F with this hash value.

The applet will also contain computer code to provide for insertion and padding to produce the final encrypted data, also as described above.

Figure 2C:
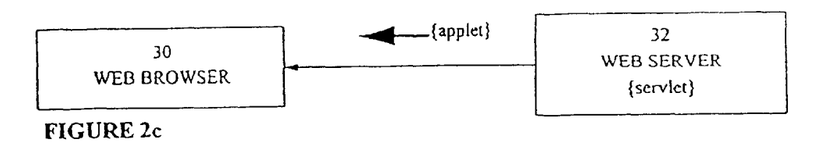
Figure 2D:
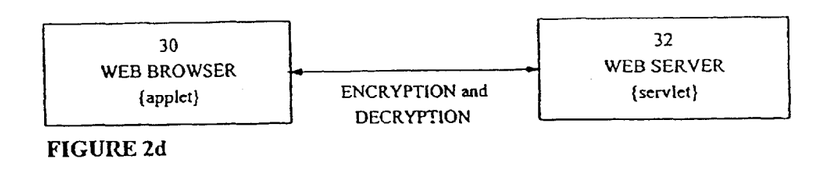

FIG. 2c shows the applet being transferred from web server 32 to web browser 30. In FIG. 2d web browser 30 is shown running the applet which permits data to be encrypted and forwarded to web server 32 where the servlet is able to decrypt the data. This mechanism requires that web browser be provided with an initial vector which initial vector is known to web server 32.

As may be seen from the above, the preferred embodiment of the invention as implemented in an Internet environment permits a remote user to communicate to a web server, where the user and the operator of the web server may agree on an predetermined initial vector. This agreement on the initial vector may occur by telephone or other communication which is distinct from the web server web browser environment. The users and operator may then communicate securely using the method of the preferred embodiment as implemented in the system described above. As described data may be exchanged between the web server and the web browser using different encryption keys for each piece of data exchanged. The initial vector will be used by the web browser and web server to permit the different session keys to be extracted from the final encrypted data as transferred between the browser and server.

Additional security features may be included in such a system, such as the use of a timing function which gives the applet and the servlet a limited valid life period to prevent later unauthorized use of the applet to communicate with the server. Since both the applet and servlet have a limited life, they become invalid when the valid life period is over.

The preferred embodiment of the invention may be implemented in the server-browser architecture as described above, or in other client-server environments such as intranets, LAN and WAN environments, where security in communication is desired.

In the preferred embodiment, the user provides the initial vector. However, the initial vector may be system-generated or may be a combination of user-supplied and system generated. The initial vector may also be identical to the key used to encrypt the session key. The initial vector must be available when the data is to be decrypted. The form of the initial vector will depend on the application in which the preferred embodiment is being used.

Although a preferred embodiment of the present invention has been described here in detail, it will be appreciated by those skilled in the art, that variations may be made thereto. For example, the preferred embodiment has been described with reference to the length of binary data being calculated in 8-bit bytes. A variation within the scope of the invention is to calculate the length of binary data in bits. All such variations may be made without departing from the spirit of the invention or the scope of the appended claims.

The embodiments of the invention in which an exclusive property or privilege is claimed are defined as follows:

What is claimed is:

1. A method for managing encryption keys for data comprising the steps of:

a) generating a session key;

b) encrypting the data using the session key, the encrypted data having a binary representation;

c) generating a key encryption key based on an initial vector, the initial vector being known only to a party encrypting the data and a party intended to decrypt the data;

d) encrypting the session key using the key encryption key, the encrypted session key having a binary representation;

e) generating a set of indices by a one-way transform mapping based on the length of the binary representation of the encrypted session key, the length of the binary representation of the encrypted data, and the initial vector; and f) reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices.

2. The method of claim 1, further comprising the selective decryption of the encrypted data by steps comprising:

a) regenerating the set of indices by using the one-way transform mapping based on the length of the binary representation of the encrypted session key, the length of the binary representation of the encrypted data, and the initial vector;

b) rebuilding the encrypted session key by using the regenerated set of indices to extract the segments of the binary representation of the encrypted session key from the output set of binary data and assembling the segments to form the encrypted session key;

c) rebuilding the encrypted data by using the regenerated set of indices to extract the binary representation of the encrypted data from the output set of binary data;

d) regenerating the key encryption key, using the initial vector;

e) regenerating the session key by decrypting the rebuilt encrypted session key using the regenerated key encryption key; and f) decrypting the rebuilt encrypted data using the regenerated session key.

3. The method of claim 1 in which the number of elements in the set of indices is equal to the number of 8-bit bytes in the binary representation of the encrypted session key, in which each element of the set of indices is an index into the binary representation of the encrypted data, and in which each segment of the encrypted session key is one byte long, whereby the step of interleaving the encrypted session key with the encrypted data comprises the bytes of the binary representation of the encrypted session key being inserted at the byte-location in the binary representation of the encrypted data determined by the indices.

4. The method of claim 1 comprising the further step of padding the output set of data with data representing the length of the binary representation of the encrypted data and with data representing the length of the binary representation of the encrypted session key.

5. A method for decrypting an output set of binary data, the output set of binary data being generated by the method of claim 1, the method for decrypting comprising the following steps:

a) regenerating the set of indices by using the one-way transform mapping based on the length of the binary representation of the encrypted session key, the length of the binary representation of the encrypted data, and the initial vector;

b) rebuilding the encrypted session key by using the regenerated set of indices to extract the segments of the binary representation of the encrypted session key from the output set of binary data and assembling the segments to form the encrypted session key;

c) rebuilding the encrypted data by using the regenerated set of indices to extract the binary representation of the encrypted data from the output set of binary data;

d) regenerating the key encryption key, using the initial vector;

e) regenerating the session key by decrypting the rebuilt encrypted session key using the regenerated key encryption key; and f) decrypting the rebuilt encrypted data using the regenerated session key.

6. A method for managing encryption keys in a computer system environment having a client and a server, comprising the steps of:

a) authenticating communication between the client and the server;

b) securely communicating an initial vector to the client and the server;

c) defining a server application and a client application in the server, whereby the client application comprises computer code, for a set of data, for the following functions:

i) generating a session key;

ii) encrypting the set of data using the session key, the encrypted data having a binary representation;

iii) generating a key encryption key based on the initial vector;

iv) encrypting the session key using the key encryption key, the encrypted session key having a binary representation;

v) generating a set of indices by a one-way transform mapping based on the length of the binary representation of the encrypted session key, the length of the binary representation of the encrypted data, and the initial vector; and vi) reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices;

and whereby the client application comprises computer code for the following functions:

vii) regenerating the set of indices by using the one-way transform mapping based on the length of the binary representation of the encrypted session key, the length of the binary representation of the encrypted data, and the initial vector;

viii) rebuilding the encrypted session key by using the regenerated set of indices to extract the segments of the binary representation of the encrypted session key from the output set of binary data and assembling the segments to form the encrypted session key;

ix) rebuilding the encrypted data by using the regenerated set of indices to extract the binary representation of the encrypted data from the output set of binary data;

x) regenerating the key encryption key, using the initial vector;

xi) regenerating the session key by decrypting the rebuilt encrypted session key using the regenerated key encryption key; and xii) decrypting the rebuilt encrypted data using the regenerated session key;

d) providing the client application to the client; and e) communicating between the client and the server by sets of data which are encrypted by the functions of the client application and decrypted by the functions of the server application.

7. A method for managing encryption keys for a plurality of sets of data comprising the steps of:

a) initializing an initial vector; and b) for each set of data:

i) generating an associated session key for the set of data using an encryption key generation algorithm whereby there is a low probability that more than two or more of the plurality of sets of data will share the same session key;

ii) encrypting the set of data using the associated session key, the encrypted set of data having a binary representation;

iii) generating a key encryption key for the associated session key, based on the initial vector;

iv) encrypting the associated session key using the key encryption key, the encrypted associated session key having a binary representation;

v) generating a set of indices for the set of data by a one-way transform mapping based on the length of the binary representation of the encrypted associated session key, the length of the binary representation of the encrypted set of data, and the initial vector; and vi) reformatting the binary representation of the encrypted set of data to generate an output set of binary data by interleaving the encrypted associated session key with the encrypted set of data by dividing the binary representation of the encrypted associated session key into segments and inserting the segments into the binary representation of the encrypted set of data at locations determined by the set of indices.

8. The method of claim 7, further comprising the selective decryption of the encrypted plurality of sets of data by steps comprising, for the decryption of each of the encrypted sets of data:

a) regenerating the set of indices for the set of data by using the one-way transform mapping based on the length of the binary representation of the encrypted associated session key, the length of the binary representation of the encrypted set of data, and the initial vector;

b) rebuilding the encrypted session key by using the regenerated set of indices for the set of data to extract the segments of the binary representation of the encrypted associated session key from the output set of binary data and assembling the segments to regenerate the encrypted session key;

c) rebuilding the encrypted data by using the regenerated set of indices for the set of data to extract the binary representation of the encrypted set of data from the output set of binary data;

d) regenerating the key encryption key for the associated session key, using the initial vector;

e) regenerating the associated session key by decrypting the rebuilt encrypted session key using the regenerated key encryption key; and f) decrypting the rebuilt encrypted data using the regenerated session key.

9. The method of claim 7 in which the number of elements in the set of indices for each encrypted set of data is equal to the number of 8-bit bytes in the binary representation of the encrypted associated session key, in which each element of the set of indices is an index into the binary representation of the encrypted set of data, and in which each segment of the encrypted associated session key is one byte long, whereby the step of interleaving the encrypted associated session key with the encrypted set of data comprises the bytes of the binary representation of the encrypted associated session key being inserted at the byte-location in the binary representation of the encrypted set of data determined by the indices for the encrypted set of data.

10. The method of claim 7 in which the step of initializing the initial vector comprises the step of receiving a password from a user.

11. The method of claim 10 in which the step of initializing the initial vector further comprises the step of a deriving the initial vector from a function which takes as its input the password, a timestamp, and a message digest which is a hashed value of a subset of the plurality of the encrypted sets of data.

12. A program storage device readable by a machine, tangibly embodying a program of instructions executable by the machine to perform the method of claim 1.

13. A program storage device readable by a machine, tangibly embodying a program of instructions executable by the machine to perform the method of claim 2.

14. A program storage device readable by a machine, tangibly embodying a program of instructions executable by the machine to perform the method of claim 5.

15. A program storage device readable by a machine, tangibly embodying a program of instructions executable by the machine to perform the method of claim 6.

16. A program storage device readable by a machine, tangibly embodying a program of instructions executable by the machine to perform the method of claim 7.

17. A program storage device readable by a machine, tangibly embodying a program of instructions executable by the machine to perform the method of claim 8.

18. A computer system for managing encryption keys for data comprising:
   a) means for generating a session key;
   b) means for encrypting the data using the session key, the encrypted data having a binary representation;
   c) means for generating a key encryption key based on an initial vector, the initial vector being known only to a party encrypting the data and a party intended to decrypt the data;
   d) means for encrypting the session key using the key encryption key, the encrypted session key having a binary representation;
   e) means for generating a set of indices by a one-way transform mapping based on the length of the binary representation of the encrypted session key, the length of the binary representation of the encrypted data, and the initial vector; and
   f) means for reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices.

19. The system of claim 18, further comprising means for the selective decryption of the encrypted data comprising:
   a) means for regenerating the set of indices by using the one-way transform mapping based on the length of the binary representation of the encrypted session key, the length of the binary representation of the encrypted data, and the initial vector;
   b) means for rebuilding the encrypted session key by using the regenerated set of indices to extract the segments of the binary representation of the encrypted session key from the output set of binary data and assembling the segments to form the encrypted session key;
   c) means for rebuilding the encrypted data by using the regenerated set of indices to extract the binary representation of the encrypted data from the output set of binary data;
   d) means for regenerating the key encryption key, using the initial vector;
   e) means for regenerating the session key by decrypting the rebuilt encrypted session key using the regenerated key encryption key; and
   f) means for decrypting the rebuilt encrypted data using the regenerated session key.

20. The system of claim 18 in which the number of elements in the set of indices is equal to the number of 8-bit bytes in the binary representation of the encrypted session key, in which each element of the set of indices is an index into the binary representation of the encrypted data, and in which each segment of the encrypted session key is one byte long, whereby the means for interleaving the encrypted session key with the encrypted data comprises means for inserting the bytes of the binary representation of the encrypted session key at the byte-location in the binary representation of the encrypted data determined by the indices.

21. The system of claim 18 further comprising means for padding the output set of data with data representing the length of the binary representation of the encrypted data and with data representing the length of the binary representation of the encrypted session key.

22. A computer program product for managing encryption keys in a computer system environment having a client and a server, comprising a computer usable medium having computer readable code means embodied in said medium to perform steps comprising:
   a) authenticating communication between the client and the server;
   b) securely communicating an initial vector to the client and the server;
   c) defining a server application and a client application in the server, whereby the client application comprises computer code, for a set of data, for the following functions:
      i) generating a session key;
      ii) encrypting the set of data using the session key, the encrypted data having a binary representation;
      iii) generating a key encryption key based on the initial vector;
      iv) encrypting the session key using the key encryption key, the encrypted session key having a binary representation;
      v) generating a set of indices by a one-way transform mapping based on the length of the binary representation of the encrypted session key, the length of the binary representation of the encrypted data, and the initial vector; and vi) reformatting the binary representation of the encrypted data to generate an output set of binary data by interleaving the encrypted session key with the encrypted data by dividing the binary representation of the encrypted session key into segments and inserting the segments into the binary representation of the encrypted data at locations determined by the set of indices;

and whereby the client application comprises computer code for the following functions:

vii) regenerating the set of indices by using the one-way transform mapping based on the length of the binary representation of the encrypted session key, the length of the binary representation of the encrypted data, and the initial vector;

viii) rebuilding the encrypted session key by using the regenerated set of indices to extract the segments of the binary representation of the encrypted session key from the output set of binary data and assembling the segments to form the encrypted session key;

ix) rebuilding the encrypted data by using the regenerated set of indices to extract the binary representation of the encrypted data from the output set of binary data;

x) regenerating the key encryption key, using the initial vector;

xi) regenerating the session key by decrypting the rebuilt encrypted session key using the regenerated key encryption key; and xii) decrypting the rebuilt encrypted data using the regenerated session key;

d) providing the client application to the client; and e) communicating between the client and the server by sets of data which are encrypted by the functions of the client application and decrypted by the functions of the server application.

* * * * *